United States Patent [19]

Buggle et al.

[11] Patent Number: 5,496,249

[45] Date of Patent: Mar. 5, 1996

[54] TOOL CHANGER FOR A PROCESSING CENTER

[75] Inventors: Guenther Buggle, Villingen-Schwenningen; Willi Schuetz, Weiden-Dornhan, both of Germany

[73] Assignee: Bernhard Steinel Werkzeugmaschinenfabrik GmbH & Co., Germany

[21] Appl. No.: 304,305

[22] Filed: Sep. 12, 1994

[30] Foreign Application Priority Data

Sep. 13, 1993 [DE] Germany ............... 43 31 064.8

[51] Int. Cl.⁶ ................................................. B23Q 3/157
[52] U.S. Cl. ................... 483/41; 483/46; 483/50
[58] Field of Search ...................... 483/50, 51, 52, 483/53, 44, 46, 41, 40, 38

[56] References Cited

U.S. PATENT DOCUMENTS

| | | | |
|---|---|---|---|
| 3,822,466 | 7/1974 | Noguchi et al. | 483/46 |
| 4,156,962 | 6/1979 | Haler | 483/46 |
| 4,599,786 | 7/1986 | Uhtenwoldt | 483/52 X |
| 4,637,120 | 1/1987 | Geiger | 483/46 |
| 4,773,152 | 9/1988 | Kitamura | 406/46 |
| 4,833,770 | 5/1989 | Esserahl | 483/41 |
| 5,093,978 | 3/1992 | Binder | 483/46 X |
| 5,107,582 | 4/1992 | Kessler | 483/44 X |

FOREIGN PATENT DOCUMENTS

| | | | |
|---|---|---|---|
| 265710 | 5/1988 | European Pat. Off. | 483/50 |
| 0396913 | 11/1990 | European Pat. Off. | |
| 237807 | 7/1986 | German Dem. Rep. | 483/51 |
| 3017613 | 11/1981 | Germany | 483/53 |
| 3731280 | 3/1989 | Germany . | |
| 3925567 | 2/1991 | Germany . | |
| 4009537 | 10/1991 | Germany . | |
| 54044 | 3/1982 | Japan | 483/52 |
| 137538 | 8/1983 | Japan | 483/51 |
| 2126136 | 3/1984 | United Kingdom | 483/50 |

*Primary Examiner*—William Briggs
*Attorney, Agent, or Firm*—Dominik & Stein

[57] ABSTRACT

A work tool changer for a work tool center with horizontal work tool spindle and an a work tool magazine, which receives the work tools in a vertical axis. The work tool changer is provided with a vertically transportable lift sled (28), on which a 2-armed gripper (94) is provided. The gripper (94) is mounted in a gripper head (66), which is pivotable between a position with horizontal gripper axle (90) and a position with a vertical gripper axis (90). The pivot movement of the gripper head (66) and the swivel movement of the gripper (94) about its gripper axle occurs by means of the same driver (44, 46, 50, 52), which drives the uplift movement of the lift sled (28).

9 Claims, 8 Drawing Sheets

Fig. 3    Fig. 4 section V - V

Fig. 5 section VI - VI

Fig. 7 section X - X

Fig. 10

TOOL CHANGER FOR A PROCESSING CENTER

BACKGROUND OF THE INVENTION

1. Field of the Invention

The present invention concerns a tool changer for a processing center, and more particularly to a work tool changer which can be constructed at reduced cost and which makes possible shorter work tool change out times. The work tool changer includes a two-armed gripper, which with one arm delivers the new work tool and with the other arm removes the no longer required work tool from the work spindle.

2. Description of the Related Art

In order to be able to accomplish the various processing steps on a workpiece automatically one after the other, automated work tool changers are employed in the processing centers, which retrieve the respectively required tools from a tool magazine, transport them to a work spindle, there exchange them for the no longer needed tool, and return the no longer needed tool to the tool magazine. In order to make possible a high flexibility of the work process and long automated processing times, work tool magazines with a high capacity are necessary. In order to store the work tools in a simple means securely in the magazine, work tool magazines are preferred in which the work tool is stored on its vertical axis. The work spindle of the processing center is preferably oriented horizontally in order to make possible a downwards freefall of turnings. Out of this there emerges the necessity that the work tool exchanger transports the work tools between the work tool magazine and the work spindles generally in three spatial axes (U-, V-, W-axis), and besides this tilts the work tool between the vertical position in the work tool magazine and the horizontal position in the work spindle. With known work tool changers the various movement steps are carried out independently from each other and one after the other. Accordingly, there are provided separate independent drive means for the individual transport steps. As a result the known work tool changers are expensive in their construction. This stepwise running of the individual movement steps requires in addition a longer work tool change out time.

SUMMARY OF THE INVENTION

The invention thus has the objective of providing a work tool changer for a processing center, which can be constructed at reduced cost and which makes possible shorter work tool change out times.

This object is solved in accordance with a work tool changer which includes a two-armed gripper, which with one arm delivers the new work tool and with the other arm removes the no longer required work tool from the work spindle. The gripper is mounted on a gripper head, which in turn is transportable by means of a lifting sled in one of the three spatial axis. By means of the lifting sled the gripper is transported between a location at the work spindle and a location at the work tool magazine. The motor, which drives the lifting sled, is herein also used to rotate the gripper about its gripper axle, so that the two arms of the gripper can alternatively be brought to the transfer position in front of the work spindle or, as the case may be, the magazine. Likewise, this motor is also used therefore, to pivot the gripper axle, so that the gripper can be brought at one location into vertical orientation of the work tool and at another location into the horizontal orientation of the work tool. Since only a single motor is necessary for the lifting movement of the gripper, for the rotating of the gripper about its axis and for the pivoting of the gripper axle, the construction cost is substantially reduced.

Further, the pivot movement of the gripper axle can be concretely coupled with the lifting movement of the lifting sled, so that the swiveling of the gripper axle occurs during the lifting movement of the lifting sled. Thereby the work tool change out time is reduced. Beyond this the swiveling of the gripper about its gripper axle is also in part accomplished by coupling with the lifting movement of the lifting sled, so that also for this a saving in the necessary time is in part made possible.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other processing centers with work tool changers for carrying out the same purposes of the present invention. It should also be realized by those skilled in the art that such equivalent structures do not depart from the spirit and scope of the invention as set forth in the appended claims.

BRIEF DESCRIPTION OF THE DRAWING

For a fuller understanding of the nature and objects of the present invention reference should be made the following detailed description taken in with the accompanying drawings in which there are shown:

FIG. 3 A side view of the carriage of the work tool changer with the lifting sled, FIG. 4 A front view of the carriage with the lifting sled, FIG. 5 The section according to lines V—V in FIG. 6, FIG. 6 The section according to lines Vi—VI in FIG. 4, FIG. 7 The side view of the top end of the lifting sled in the view X in FIG. 4, FIG. 8 The front view of the FIG. 7, FIG. 9 A representation corresponding to FIG. 7 in a different operational condition, and FIG. 10 A section according to line X—X in FIG. 3.

DETAILED DESCRIPTION OF THE INVENTION

A preferred embodiment of the present invention will now be described in greater detail by reference to the drawings.

Figure 1:
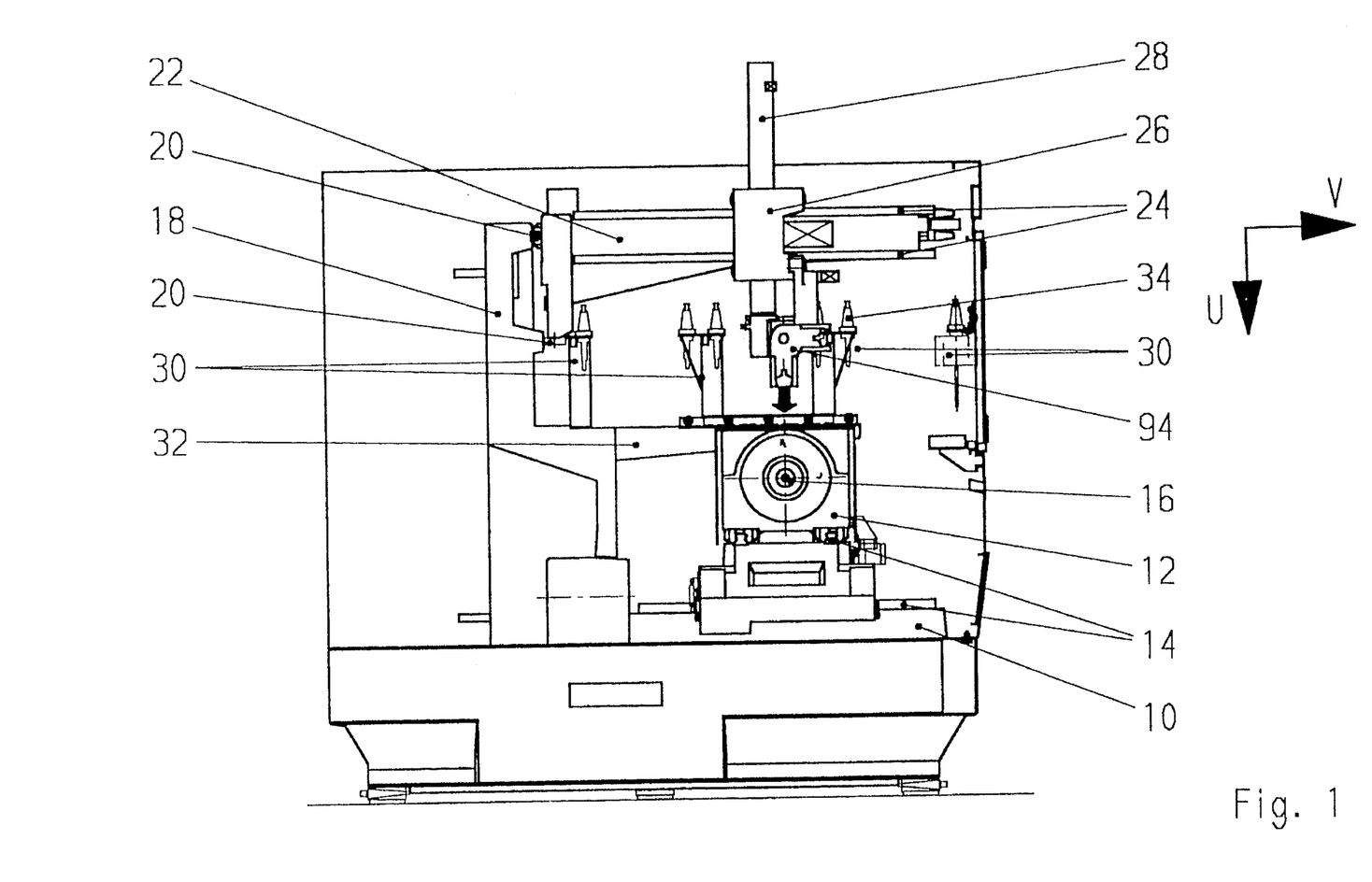
FIG. 1 A front view of a processing center with a work tool changer.
Figure 2:
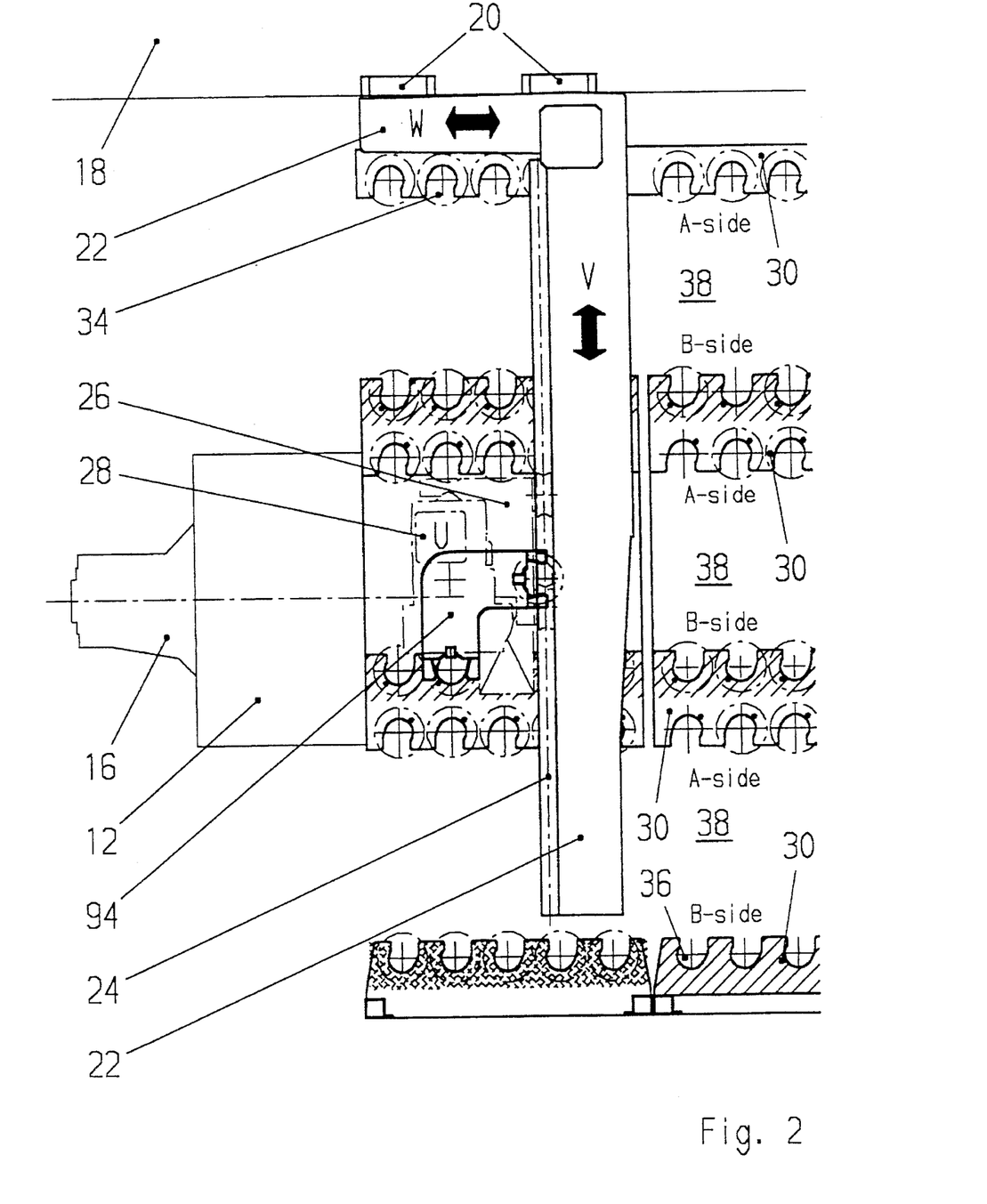
FIG. 2 A top view of a processing center.

FIGS. 1 and 2 show a processing center with a machine bed 10 on which a spindle box 12 is slidably mounted in transverse-section (Y-axis) and in the longitudinal direction (Z-axis) by means of guides 14. In the spindle box 12 a horizontally oriented work spindle 16 is supported with a work tool tensioning device.

On a vertical wall of the machine frame 18 parallel to the spindle 16 there are provided above the spindle box 12 in the longitudinal direction horizontal guides 20, in which a movable carrier 22 is mounted displaceable in the W-direction. The movable carrier 22 is driven by means of a not shown motor drive means. The movable carrier 22 projects horizontally perpendicularly from the wall 18 across the entire breadth of the machine bed 10. In the horizontal guides 24 of the movable carrier 22 a carriage 26 is slidable by means of a not shown drive motor. In the carriage 26 a vertically displaceable lifting sled 28 is provided.

Superior to and behind the spindle box 12 and underneath the movable carrier 22 a work tool magazine 30 is provided, which in part is provided on a console 32 extending from the wall 18 and in part as provided on the outer wall of the machine casing. The work tool magazine 30 consists as needed of individual work tool holders. The work tools 34 are oriented in the work tool magazine in a vertical axis and are stored in work tool receivers 36, which are positioned in rows parallel to the wall 18 (W-axis). Between the rows of work tool receivers 36 channels 38 remain open, in which the work tool changers can enter.

Figures 3, 4:
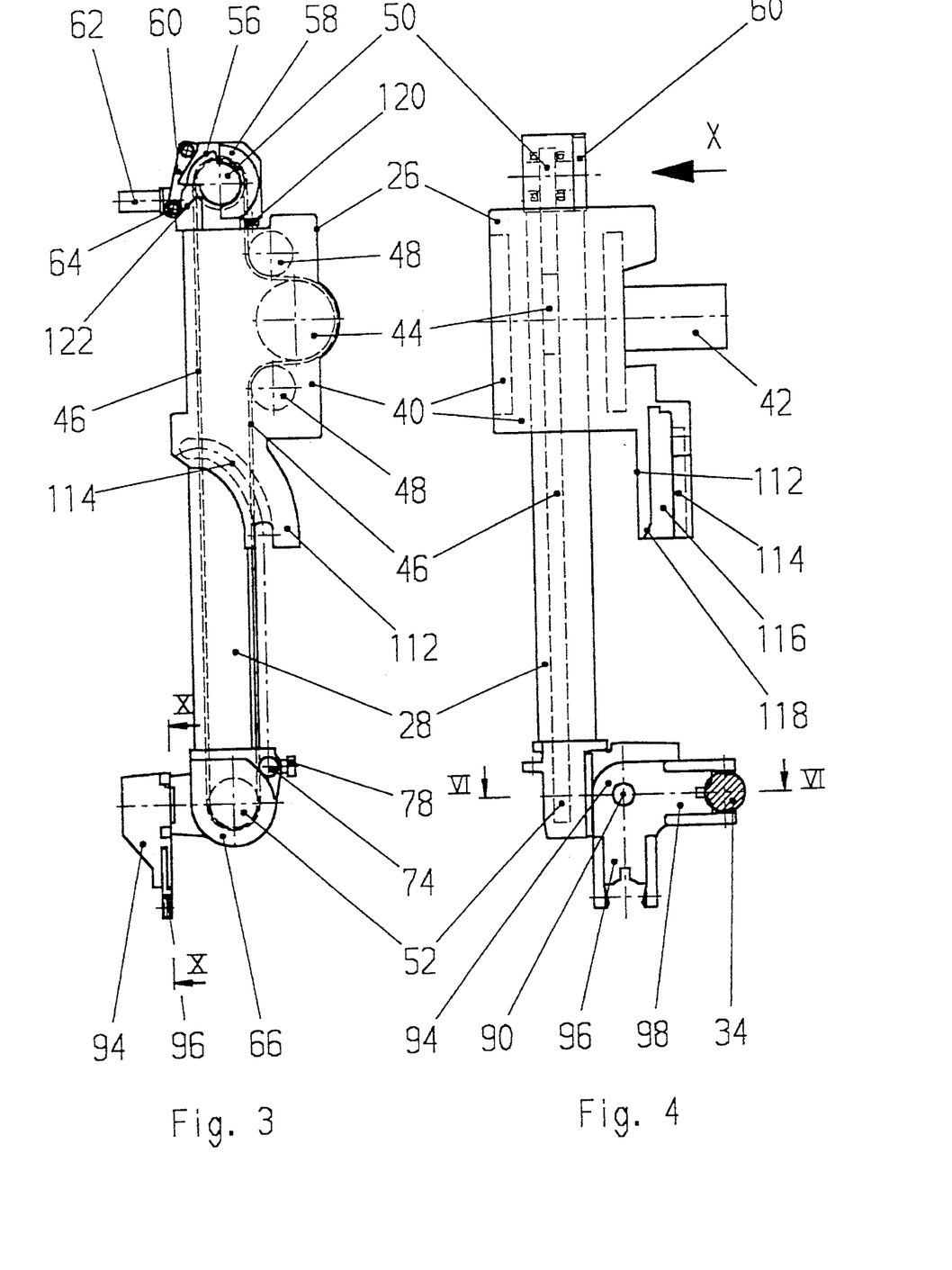

The carriage 26 with the lifting sled 28 is shown in greater detail in FIGS. 3 and 4. The carriage 26 is provided with a frame 40 of vertical plates. The frame 40 is mounted slidably in the guides 24 of the movable carrier 22. The lifting sled 28 is mounted vertically slidably in the frame 40 by means of roller bearings. The lifting sled 28 is constructed as a vertical stanchion, which is transportable over a lifting way, which essentially corresponds to the vertical separation between the spindle 16 and the plane of the work tool receiver 36 of the work tool magazine 30.

Outside on the frame 40 an electric motor 42 is provided. The motor 42 drives a belt drive pulley 44 which, with its horizontal axis, is mounted on frame 40. An endless toothed conveyor belt 46 is conveyed about a drive belt pulley 44 via a deflector pulley 48. The endless toothed conveyor belt 46 runs over an upper conveyor belt pulley 50 mounted up in the lifting sled 28 and a lower conveyor belt pulley 52 mounted underneath on the lifting sled 28.

Figures 7, 8:
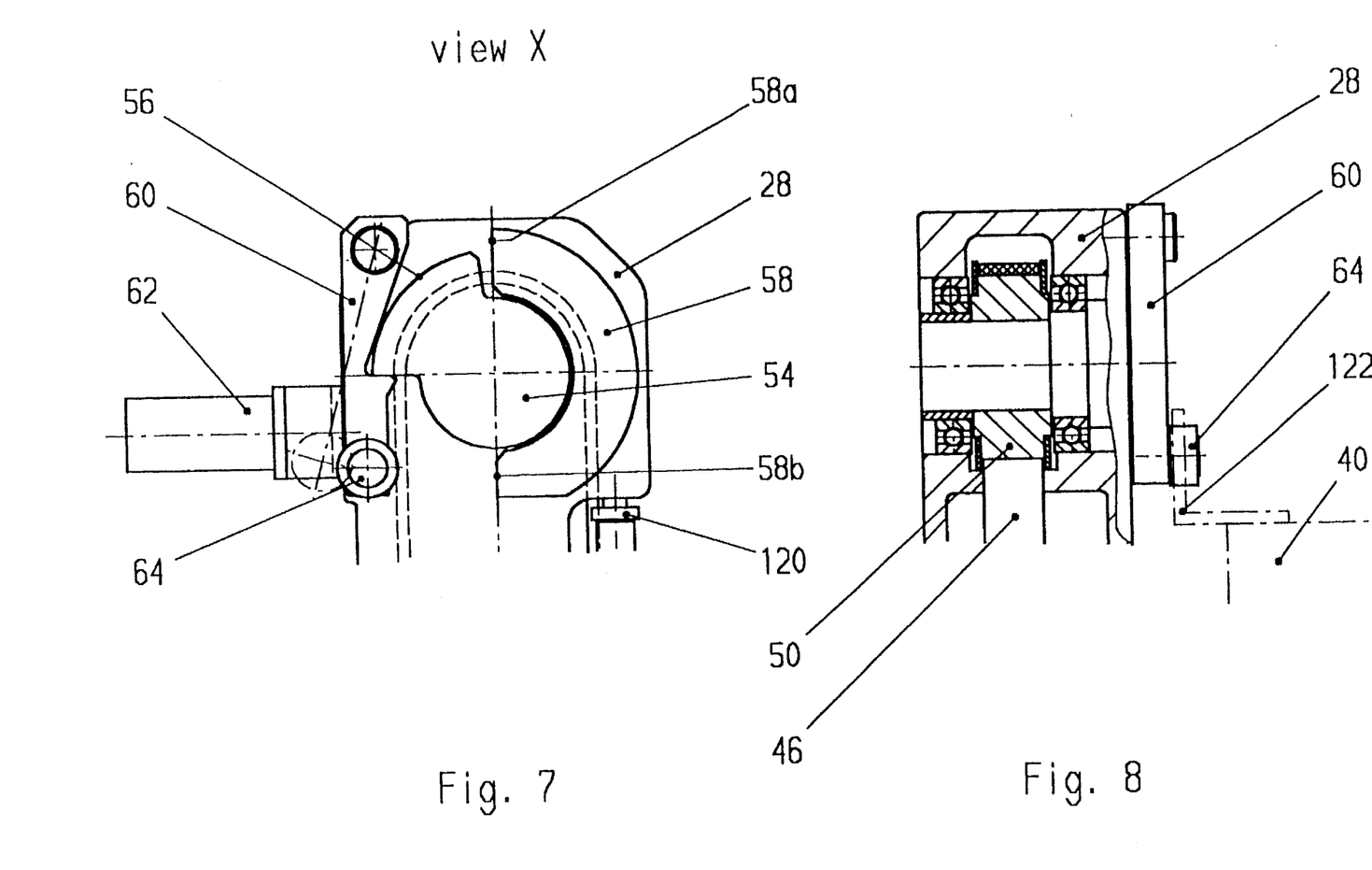
Figure 9:
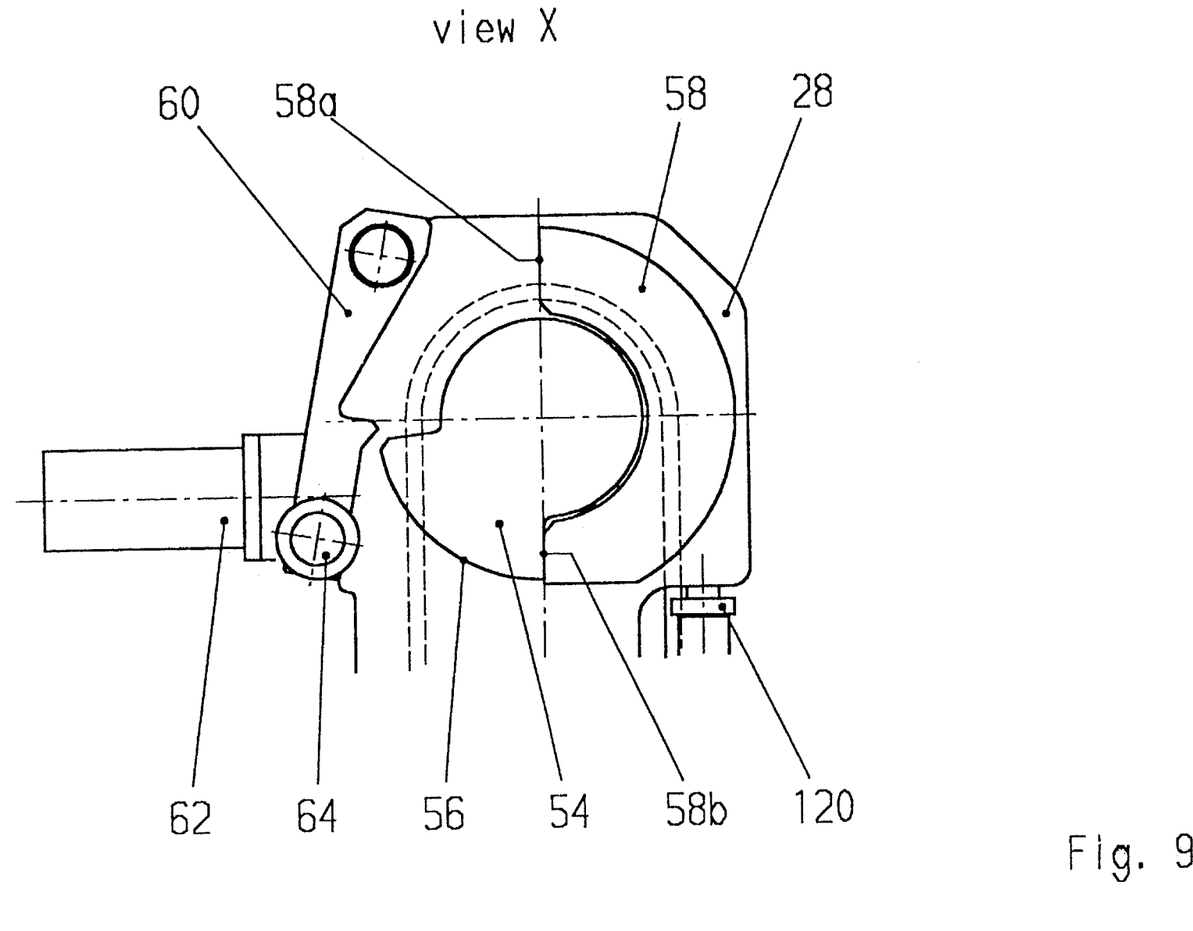

As shown in FIGS. 7–9, a ratchet disc 54 is seated fixed against rotation on the axis of the upper conveyor belt pulley 50, which exhibits a greater radius over an arc of about 90°. The area of the ratchet disc 54 with the smaller radius is enclosed over an arc of about 180° with a rest stop piece 58 which is secured to the lift sled 28, which forms an upper rest stop 58a and a 180° offset lower rest stop 58b for the sector 56 of the ratchet disc 54. The rotational movement of the ratchet disc 54 and therewith the upper conveyor belt pulley 50 is thereby reduced to an angle of about 90°. Further, a catch is pivotably mounted upon the sled 28. The catch 60 is urged by means of a pneumatic cylinder 62 and held against the circumference of the ratchet disc 54. The catch 60 can enter with its nose into the ratchet disc 54 behind the sector 56, when the sector 56 is positioned at the upper rest stop 58a, as it is shown in FIG. 7. In the case of the catch 60 has in this manner fallen into the ratchet disc 54, then the ratchet disc 54 is held securely between the nose of the catch 60 and the upper stop rest or detente 58a of the rest stop part 58, so that the conveyor belt pulley 50 is arrested against rotation on the lift sled 28. The catch 60 can be lifted out of the ratchet disc 64 by means of a start-up roller 64 provided on the free end.

Figure 5:
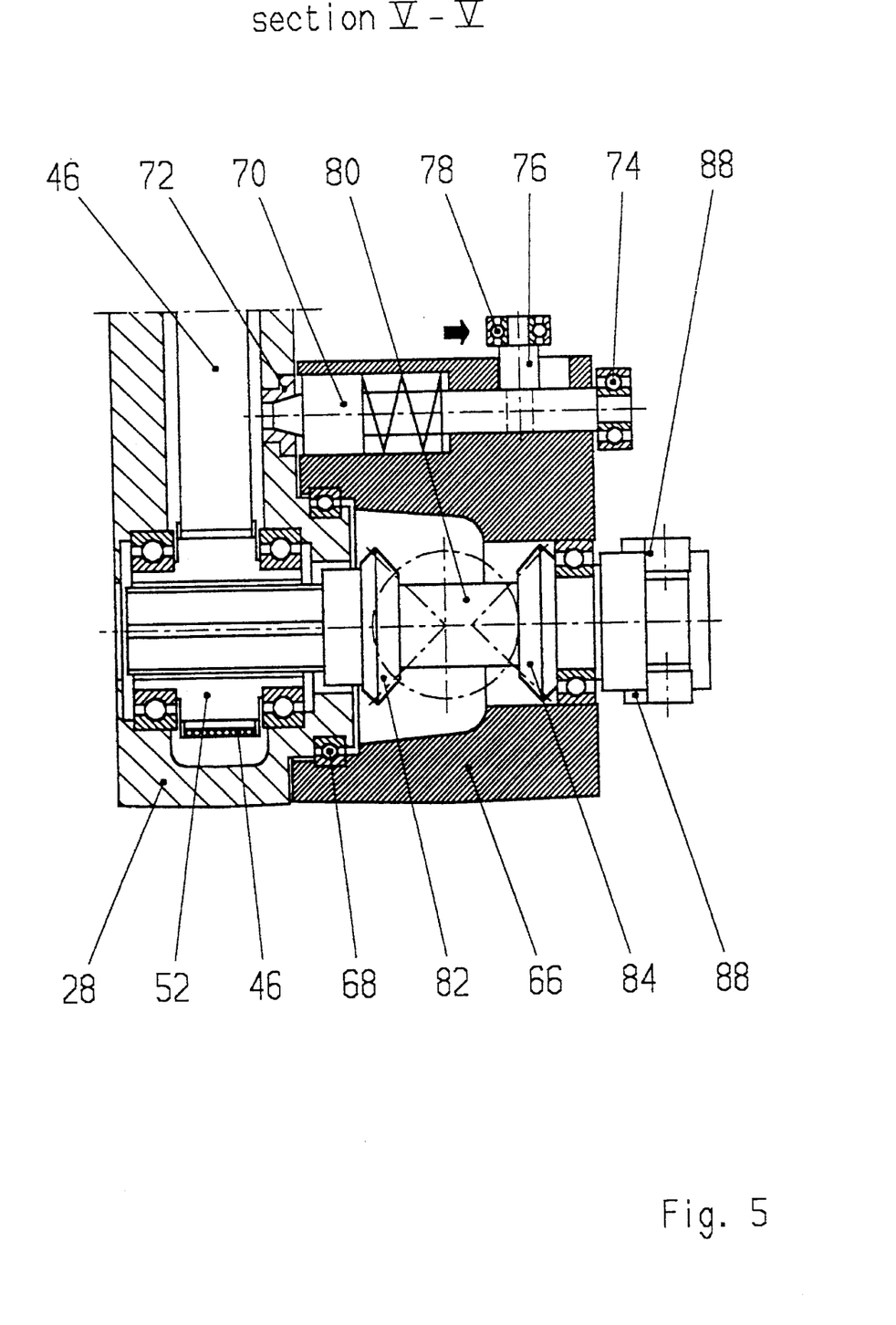

A gripper head 66 is provided sideways at the lower end of the lift sled 28. As can be seen in detail in FIGS. 5 and 6, the gripper head 66 is rotatably mounted on the lift sled 28 by means of a ball-bearing mount 68, wherein the rotation axis corresponds with the axis of the lower conveyor belt pulley 52. On the gripper head 66 an index shaft 70 is mounted parallel to the rotation axis of the grip head 66, which is urged by spring means into the bore hole 72 of the lift sled 28 in order to arrest the grip head 66 against rotation on the lift sled 28. On the end of the gripper head 66 projecting end of the index shaft 70 there is seated a rotatably mounted collision roll 74. Perpendicularly in the index shaft 70 a plug 76 is seated, which projects though an in the longitudinal direction of the index shaft 70 extending bore hole of the gripper head 66 and on this end extending out of the grip head 66 a roll 78 is rotatably mounted.

Figure 6:
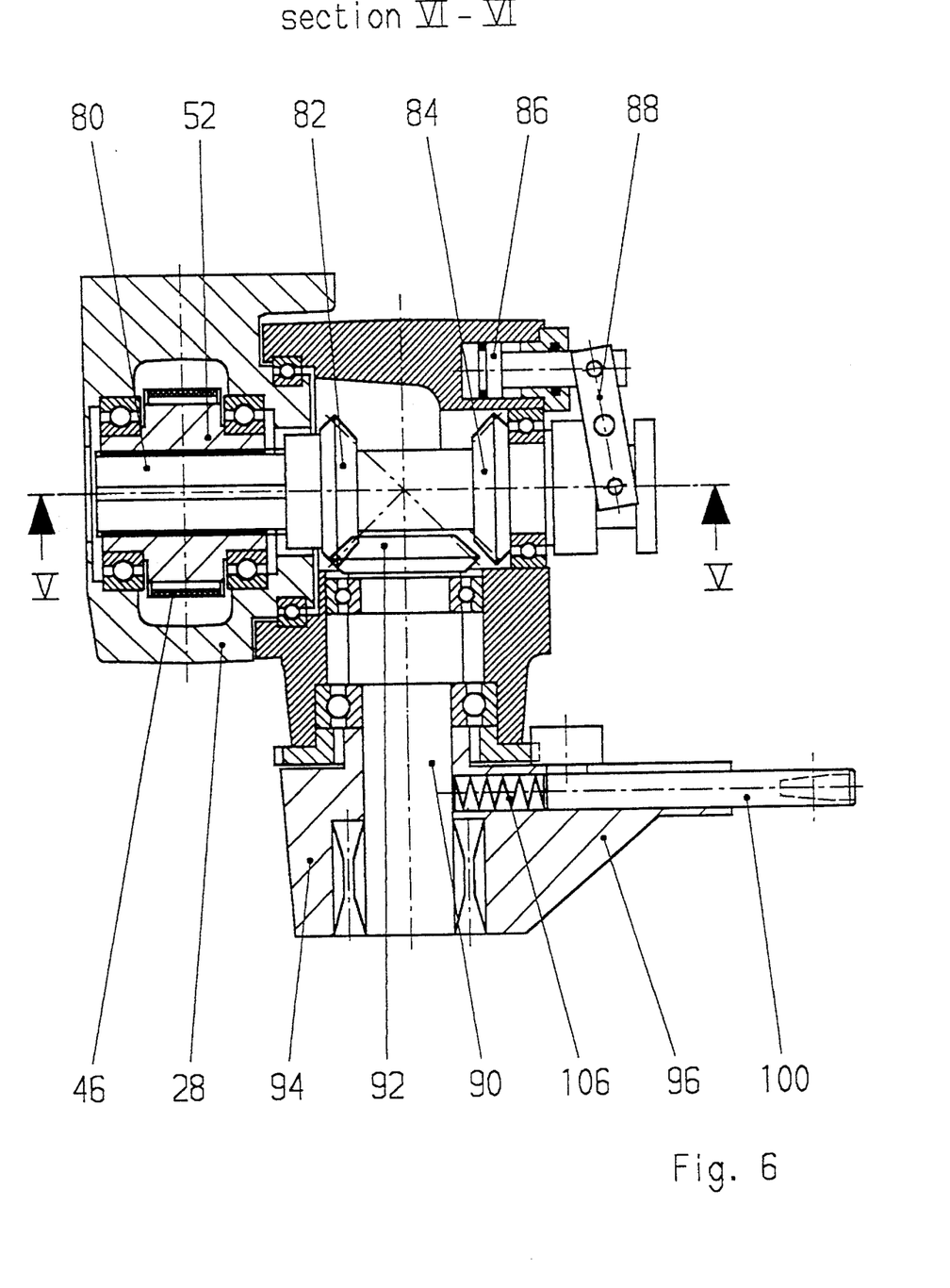
Figure 10:
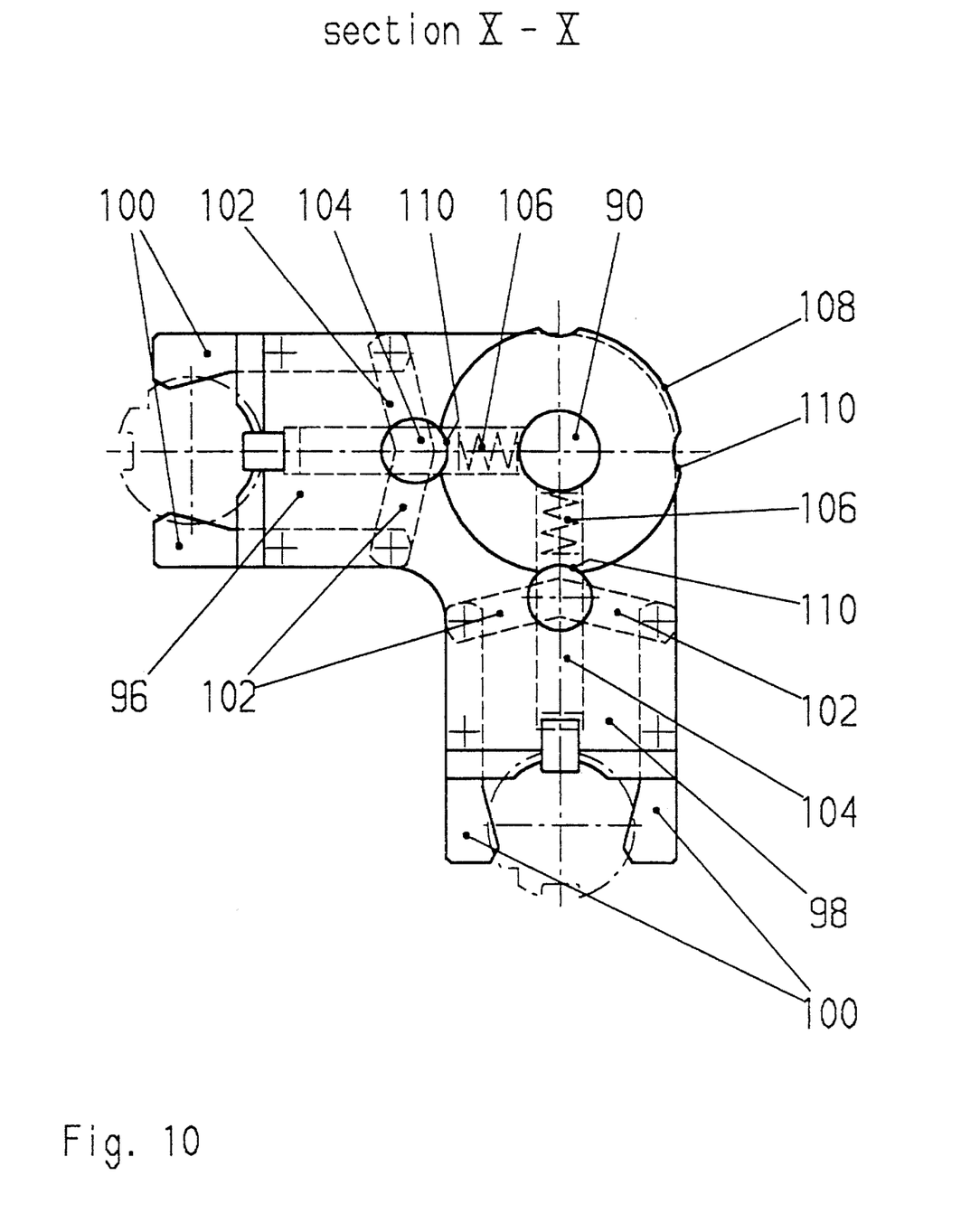

The lower conveyor belt pulley 52 which by means of ball-bearings is mounted on the conveyor sled is axially penetrated by a splined shaft 80, which is axially slidable in the lower conveyor belt pulley 52 and from this conveyor belt 52 in the direction of rotation is locked and in tandem taken along. The spline shaft 80 penetrates axially through the gripper head 66. On the gripper head 66 two beveled gears 82 and 84 are keyed in on the splined shaft 80. The beveled gears 82 and 84 are positioned on the splined shaft 80 with a small axial separation and with tips facing each other. The splined shaft 80 is by means of a fluid cylinder 86 axially displaceable over a swivel lever, as shown in FIG. 6. Perpendicularly to the splined shaft 80 there is in the gripper head 66 a gripper axle 90 rotatably mounted. On the inner end of the gripper axis 90 there is seated a beveled gear 92, which respectively according to the axial displacement position of the splined shaft 80 either with the beveled gear 82 or with the beveled gear 84 comes into engagement. Outside of the gripper head 66 there is seated on the gripper axle 90 a gripper 94 with two arms 96, 98 oriented at right-angles to each other and right-angled to the gripper axle 90. As can be seen from FIG. 10, these arms 96 and 98 respectively exhibit two jaws 100 pivotable against each other. The free front ends of these jaws 100 serve for gripping of the work tools 34. The aft ends of the jaws 100 are respectively linked by means of a lever 102 on a pusher 104, which is mounted centrally slidably radially in the arms 96 or 98. The pusher 104 is biased radially towards the outside by means of a spring 106, so that the lever 102 swivels the jaws 100 in the manner of an elbow lever or toggle switch in the closed position against each other. The opening of the jaws 100 is achieved against the force of the spring 106. The pushers 104 support themselves radially inside on the circumference of one of the discs 108 concentric to the gripper axis 90. The radius of the disc 108 is so selected, that the pusher 104 is held in the closed position of the jaws 100, so that the jaws 100 are securely arrested in the closed position. Respectively offset about 90° the circumference of the disc 108 exhibits recesses 110. As the gripper 94 enters into an angular position, in which the pusher 104 enters into the recesses 110, then the pusher 104 can be moved against the force of the spring 106 towards inside, so that an opening of the jaw 100 is made possible.

As can be seen from FIGS. 3 and 4, a collision plate 112 is provided on the lower side of the frame 40. In the collision plate 112 two collision tracks 114 and 116 are provided. The collision tracks 114 and 116 begin with a lower vertically upwards directed entryway and proceed to describe a quarter arc such that the upward end essentially runs horizontally, as is clearly to be seen in FIG. 3. The two collision tracks 114 and 116 are provided oriented in their profile cross-section right angularly to each other, as most clearly seen in FIG. 4. The open lower entry end of the collision tracks 114 and 116 are so oriented, that the collision roll 74 enter in the collision track 114 and the roller 78 enter in the collision track 116, when the lift sled 28 is moved out of the position shown in FIGS. 3 and 4 towards upwards. The collision track 116 for the roller 78 of the plug or lug 76 is provided with an entry bevel or inclination 118 as can be seen in FIG. 4. If the roller 78 runs during entrance in the collision track 116 over the entry bevel or inclination 118, so it will be displaced in the axially direction of the index shaft 70, so that the plug 76 of the index shaft 70 is lifted against the spring pressure out of the bore hole 72. Thereby the gripper head 66 is released from the lift sled 28 and is rotatable. If the collision roll 74 and the roller 78 proceed further in the upwards direction of the lift sled 28 in the arcuate collision track 114 or 116, then the gripper head 66 is swiveled about the axis of the splined shaft 80 corresponding to the quarter rotation bow of the collision tracks 114 and 116 about 90°. Thereby a swiveling of the gripper axis 90 between a horizontal position and a vertical position as shown in in FIGS. 3 and 4 is made possible.

In the following the manner of the operation of the work tool changer is discussed in greater detail, from which also further construction details become clear.

In the description of the work tool change cycle, one begins first with a position in which the lift sled 28 is found in an upper position. The runner carrier 22 and the carriage 26 are so driven, that the lift sled 28 is positioned in front of the spindle 16.

The motor 42 runs in the direction of rotation, that the drive conveyor belt pulley 44 rotates in the representation in FIG. 3 in the clockwise direction. Therewith, the upper conveyor belt pulley 50 is also rotated in the clockwise direction; this rotation is however blocked, since it abuts with its upper conveyor belt pulley connected latch disc 54 with its sector 56 on the detente 58a, as is shown in FIG. 7. Since the upper conveyor belt 50 is blocked, the conveyor belt drive pulley 54 is driven in the clockwise direction, so that the lift sled 28 in the frame 40 is moved downwards. The gripper head 66 assumes the position shown in FIGS. 3 and 4 with horizontal gripper axis and is locked on the lift sled 28 by means of the index shaft 70. The gripper 94 assumes the position as shown in FIG. 4, whereby the arm directed downwards 96 is emptied, while the horizontal arm 98 is holding a new work tool.

When the lift sled 28 reaches the lower position, the empty arm 96 of the gripper 94 is shoved onto the work tool to be replaced as found on the spindle 16 and grips the same. The jaws 100 of the arms 96 can thereby be forced apart against the force of the spring 106, in order to grip the work tool. The work tool is then held between the jaws 100 by means of a force transmitted over lever 102 of spring 106. Now the spindle box 12 is moved downwards in the Z-direction, so that the work tool to be replaced is lifted out of the spindle 16.

In this lowest position of the lift sled 28, which as a result of detente 120 of the lift sled on the frame 40 is defined, the arrest latch 60 runs with its start-up roller 64 on a start-up bevel 122 which on the upper rim of the frame 40 is provided. Thereby the latch 60 is lifted against the spring force of the pneumatic cylinder 62 out of the latch disc 54, as shown in FIG. 3.

The motor 42 is now switched over and drives the drive conveyor belt pulley 44 in the counterclockwise direction. The toothed conveyor belt 46 now take the upper conveyor belt pulley 50 along, which rotates itself about 90° out of the position shown in FIG. 3 to the position shown in FIG. 9, until the sector 56 comes into abutment on the lower stop 58b. The latch 60 travels thereby on the outer circumference of sector 56. This rotation of the upper conveyor belt pulley 50 about 90° corresponds to a rotation of the lower conveyor belt pulley 52 likewise about 90°. The rotation of the lower conveyor belt pulley 52 about 90° drives, via the splined shaft 80, the beveled tooth gear 82 and the therewith in engagement bevel 92 drives the gripper axis 90, since the gripper head 66 is locked on the lift sled 28. The gripper 94 is thereby likewise swiveled about 90°, so that now the arm 96 with its work tool to be replaced is oriented horizontally and the arm 98 with the new work tool 34 is oriented towards downwards in the position in front of the spindle 16. Now the spindle box 12 is again driven forwards, so that the new work tool 34 is seated in spindles 16. Upon the swivel movement of the gripper 94 the pushers 104 run the arm 96 and 98 on the circumference of the disc or pulley 108, so that the jaws 100 are blocked and a falling out of the work tool 34 out of the gripper 94 during the swivel movement is precluded. In the about 90° swiveled position of the gripper 94 the pusher 104 comes again into coverage with the recesses 100 and 10, so that the work tool 34 is again held by the spring in the jaws 100. The gripper 94 can now be driven upwards, whereby the jaws 100 of the arms 98 are pulled off of the work tool 34 held by the spindle 16.

For the upward movement of the lift sled 28 the motor 42 is further driven in the counterclockwise direction of the drive conveyor belt pulley 44. The ratchet disc 54 with its sector 56 abutting against the lower stop 58b thereby blocks the upper conveyor belt pulley 50, so that the drive of the drive conveyor belt pulley 44 results in an upward conveyance of the lift sled 28. The stop latch 60 thereby becomes free of the start-up bevel 122, lies however still on the sector 56 of the ratchet disc 54, as is shown in FIG. 9.

When the lift sled 28 approaches its upper end position, the gripper head 66 reaches to the collision plate 112. Next the roller 78 of the plug 76 runs on the entry bevel 118 of the collision track 116. Thereby the index shaft 70 is pulled out of the bore hole 72 of the lift sled 28, so that the gripper head 66 now is freely rotatable with respect to the lift sled 28. During the further upward movement the collision roller 74 of the index shaft 70 runs in the bowed collision track 114, while the roller 78 also runs in the parallel collision track 116. The gripper head 66 is thereby about its axis, which is common with the splined shaft 80 axis, swiveled about 90°, until at the end of the swivel movement with vertical gripper axle 90 it remains standing, when the collision roll 74 has reached the horizontal end of the collision track 114. In the horizontal end section of the collision track 114 seated collision roll 74 retains the lift sled 28 in its upper end position.

During the turning of the gripper head 66 the bevel gear 92 of the gripper axle rotates itself off of the splined shaft 80 held on the bevel gear 82, so that the gripper axle 90 is rotated and also the gripper 94 is swiveled about 90°. By selective coupling of the bevel gear 82 or the bevel gear 84 in the bevel gear 92 of the gripper axle 90 by means of the fluid cylinder 85 that can be selected whether the gripper 94 is swiveled about 90° towards the right or towards the left.

In the upper end position of the lift sled 28 there is to be found a gripper 84 on the site of the work tool receiver 36 of the work tool magazine 30, wherein its gripper axle 90 is vertically oriented downwards, the swivel plane of the gripper 94 at the same time is horizontal. According to the swivel direction of the gripper 94 there exhibits at this time the empty arm 94 in the W-direction viewed towards the right or towards the left, while the arm 96 with the tool to be exchanged is oriented in the W-direction towards the front or towards the back.

By means of the carriage 26 and the runner carrier 22 the gripper 94 is now directed in one of the channels 38 of the work tool magazine 30, until the empty arm 98 reaches on the work tool receiver 36, in which the next, according to the control program called up work tool 34 is stowed. The selection of the swivel direction of the gripper 94 by means of the bevel tooth gear 82 or 84 serves therefore, that of the empty arm 98 of the gripper 94 already during the upwards movement of the lift sled 28 is so oriented, that on the work took receiver 36 is oriented to the A-side or the work tool receiver 36 or on the opposingly provided B-side of the channel 38.

The gripper 94 is now moved against the selected work tool receiver 36, whereby the empty arm 98 engages the selected new work tool. The work tool 34 is removed out of the work tool receiver 36. Then the motor 42 is again switched on in the rotational direction, that the drive conveyor belt pulley 44 rotates in the clockwise direction. The upper conveyor belt pulley 50 can rotate itself thereby about an angle of about 90° in the clockwise direction, whereby the sector 66 of the ratchet disc 54 rotates about 90° out of the position shown in FIG. 9 and again abuts against the upper stop 58a. The stop latch 60 can again fall in behind the sector 56, so that the upper conveyor belt pulley 50 is again blocked, as it is shown in FIG. 7. With this rotation, the upper conveyor belt pulley 50 about 90° the orientation of the splined shaft 80 via the bevel gear wheel 82 or the bevel gear wheel 84 of the gripper 94 is rotated about 90° towards the right or towards the left, so that now the arm 96 with the work tool being replaced is oriented on the work tool receiver 36, from which the new work tool has been removed. By sliding of the gripper 94 the work tool 34 being returned can now be stored in the empty work tool receiver 36. By means of the carriage 26 and the carriage track 22 the lift sled 28 is now conveyed again in its position above and in front of the spindle 16. Thereby the new work tool finds itself in the ready position for the next changing out of tools.

As soon as the next work tool exchange is to be carried out, the lift sled 28 is moved lower, wherefore the motor 42 of the drive conveyor belt pulley 44 again is driven in the clockwise direction. The locking disc bolt 54 is now found in the locking position as shown in FIG. 7 so that the drive of the tooth pulley 46 results in a lowering movement of the lift sled 28. In this downwards movement the collision roll 74 enters again downwards into the collision track 114, whereby the gripper head 66 again is swiveled out of its position with vertical gripper axis 90 into its position with horizontal gripper axle 90. At the same time there is, as a result of the rotating off of the beveled tooth gear 92 of the gripper axle 90 on the respectively decoupled beveled gear wheel 82 or 84 of the gripper 94 about its gripper axle 90 so swiveled, that now again empty arm 96 is directed downwards and that the new work tool 34 or holding arm 98 is positioned horizontally. As soon as the collision roller 74 emerges from the collision track 114, the roller 78 of the plug 76 runs over the entry bevel 118 of the collision track 116, so that the index shaft 70 by spring force again in the bore hole 72 is pressed and the gripper head 66 again is locked on the lift sled 28. Thereby the work tool changer finds itself again in the above described staring position of the cycle.

Although the system was first designed for exchanging work tools in a processing center, it will be readily apparent that the system is capable of application to related devices, and is thus capable of use in a number of other applications. Although this invention has been described in its preferred form with a certain degree of particularity with respect to a machining or processing center, it is understood that the present disclosure of the preferred form has been made only by way of example and that numerous changes in the details of structures and the composition of the system may be resorted to without departing from the spirit and scope of the invention.

Now that the invention has been described,
We claim:

1. A work tool changer for a processing center, said processing center including a horizontal work spindle and a work tool magazine in which the work tools are positioned on their vertical axis, the work tool changer comprising a carriage mounted movably horizontally in the direction perpendicular to the work spindle (V-axis) and in the direction horizontally parallel to the work spindle (W-axis), a lift sled mounted on the carriage movably in the vertical direction (U-axis), a motor mounted on the carriage for driving the lift sled in the vertical direction (U-axis), a gripper head mounted swivelably on the lift sled, a two armed gripper mounted on said gripper head and rotatable about a gripper axle, a collision track into which the lift sled enters during the vertical movement of the lift sled for swiveling the gripper head between a position in which the gripper axle is horizontal and a position in which the gripper axle is vertical whereby the gripper is moveable between positions with vertical and with horizontal orientated work tools, and wherein the motor drives the lift sled over an endless running lift means and switchably drives the rotational movement of the gripper about its gripper axle.

2. A work tool changer according to claim 1, wherein the arms (96, 98) of the gripper (94) are oriented perpendicularly to each other and perpendicular to the gripper axle (90).

3. A work tool changer according to claim 1, wherein the gripper head (66) is held securely on the lift sled (28) with a locking means, which is releasable for swiveling of the gripper head (66).

4. A work tool changer according to claim 3, wherein the locking means is comprised of an index shaft (70) mounted in the gripper head (66), which engages in the lift sled (28) and during the lift movement of the lift sled (28) is lifted out of the lift sled (28) via a start-up bevel (18).

5. A work tool changer according to claim 1, wherein said lift means is comprised of a toothed belt (46) running over an upper conveyor belt pulley (50) and a lower conveyor belt pulley (52) mounted on the lift sled (28).

6. A work tool changer according to claim 5, wherein one of said conveyor belt pulleys (50) is blocked in order to drive the lift sled (28) by means of the toothed belt (46), and is switchable to a limited angle of rotation, in order to drive the swivel rotation movement of the grippers (94) while the lift sled (28) is stationary.

7. A work tool changer according to claim 6, wherein the gripper (94) is driven by means of a beveled tooth gear (93) seated on the gripper axle (90), which is in engagement with a bevel gear wheel (82), which is coupled secured against rotation to one of the conveyor belt pulleys (52).

8. A work tool changer according to claim 7, wherein an axially displaceable splined shaft (80) is fixed against rotation with a conveyor belt pulley (52), and wherein the splined shaft (80) is secured with two axially separated beveled tooth gears (82 and 84) with their tips directed against each other, which by axial sliding of the splined shaft (80) selectively come into engagement with the beveled tooth gear wheel (92) of the gripper axle (90), in order to determine the swivel direction of the gripper (94).

9. A work tool changer according to claim 1, wherein the work tool magazine (30) is oriented in a horizontal plane above the work tool spindle (16) and is comprised of work tool receivers (36) arranged in a row parallel to the axis of the work tool spindle (16), in which channels (38) remain free for entry of the gripper (94).

* * * * *